United States Patent [19]
Branc et al.

[11] Patent Number: 4,685,303
[45] Date of Patent: Aug. 11, 1987

[54] DISC DRIVE ISOLATION SYSTEM

[75] Inventors: Joseph R. Branc, Wickliffe; Thomas J. Merchant, Willoughby; William L. Miller, Chagrin Falls; Philip J. Pisczak, Novelty, all of Ohio

[73] Assignee: Allen-Bradley Company, Inc., Milwaukee, Wis.

[21] Appl. No.: 754,618

[22] Filed: Jul. 15, 1985

[51] Int. Cl.⁴ .................... F25B 21/02; G11B 15/18
[52] U.S. Cl. ........................ 62/3; 236/44 C; 360/69; 361/384; 369/19
[58] Field of Search .............. 62/3; 236/44 C; 165/27; 361/381, 384; 360/69, 137; 369/19

[56] References Cited

U.S. PATENT DOCUMENTS

| | | | |
|---|---|---|---|
| 4,147,299 | 4/1979 | Freeman | 361/381 |
| 4,259,843 | 4/1981 | Kausch | 62/3 |
| 4,364,234 | 12/1982 | Reed | 62/3 |
| 4,495,780 | 1/1985 | Kaneko et al. | 361/381 X |
| 4,599,670 | 7/1986 | Bolton | 360/137 |

OTHER PUBLICATIONS

Product Data 3-020 Product Brochure entitled "RDS-1500 Series Cartridge-Loaded Winchester Disk System", of Miltope Corporation, 1770 Walt Whitman Road, Melville, N.Y. 11747, undated.
Applicants' Exhibit 1, *Electronic Products,* Jan. 1, 1985, pp. 23-24.
Applicants' Exhibit 2A, Allen-Bradley Press Release, Apr. 1984, admitted published prior to Jul. 15, 1984.
Applicants' Exhibit 2B, Letter from Z. Alan Fink of Allen-Bradley to Mr. Dave Ruopp of ITP Boston, Inc., dated Apr. 30, 1984.
Applicants' Exhibit 2C, Allen-Bradley "Typical Sub Area" drawing, dated Apr. 30, 1984.
Applicants' Exhibit 2D, Allen-Bradley "Market Requirements" sheet, dated May 11, 1984.
Applicants' Exhibit 2E, Allen-Bradley "Introductory Area Control System—Feb. 1985" drawing, dated May 14, 1985.

*Primary Examiner*—William E. Wayner
*Attorney, Agent, or Firm*—Quarles & Brady

[57] ABSTRACT

A disc drive isolation system including an environment control enclosure and a disc drive isolation module is disclosed. A thermo-electric heat pump is mounted to the enclosure for cooling the interior of the enclosure and a fan circulates air within the enclosure. A humidity sensor controls the heat pump and the fan in response to the sensed humidity of the interior air. First and second temperature sensors control the heat pump and the disc drive, respectively. The isolation module is disposed in the enclosure and has an outer body and an inner body supported within the outer body with the disc drive mounted within the inner body. The mounting of the inner body within the outer body sequesters the disc drive against vibration and shock applied to the outer body. This arrangement enables almost any disc drive to be operated in an industrial environment independent of the temperature, humidity, cleanliness, shock and vibration characteristics of the environment.

7 Claims, 15 Drawing Figures

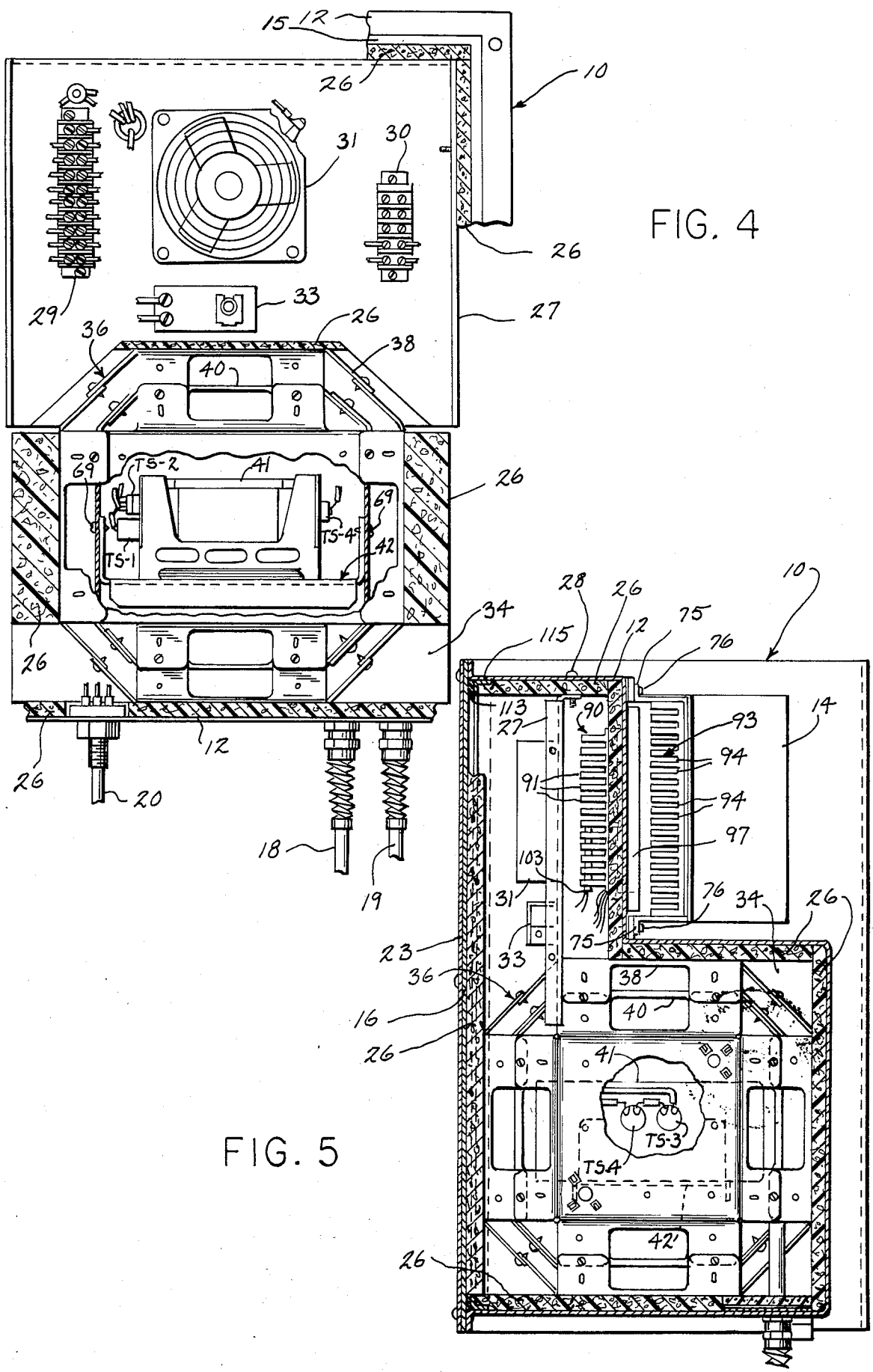

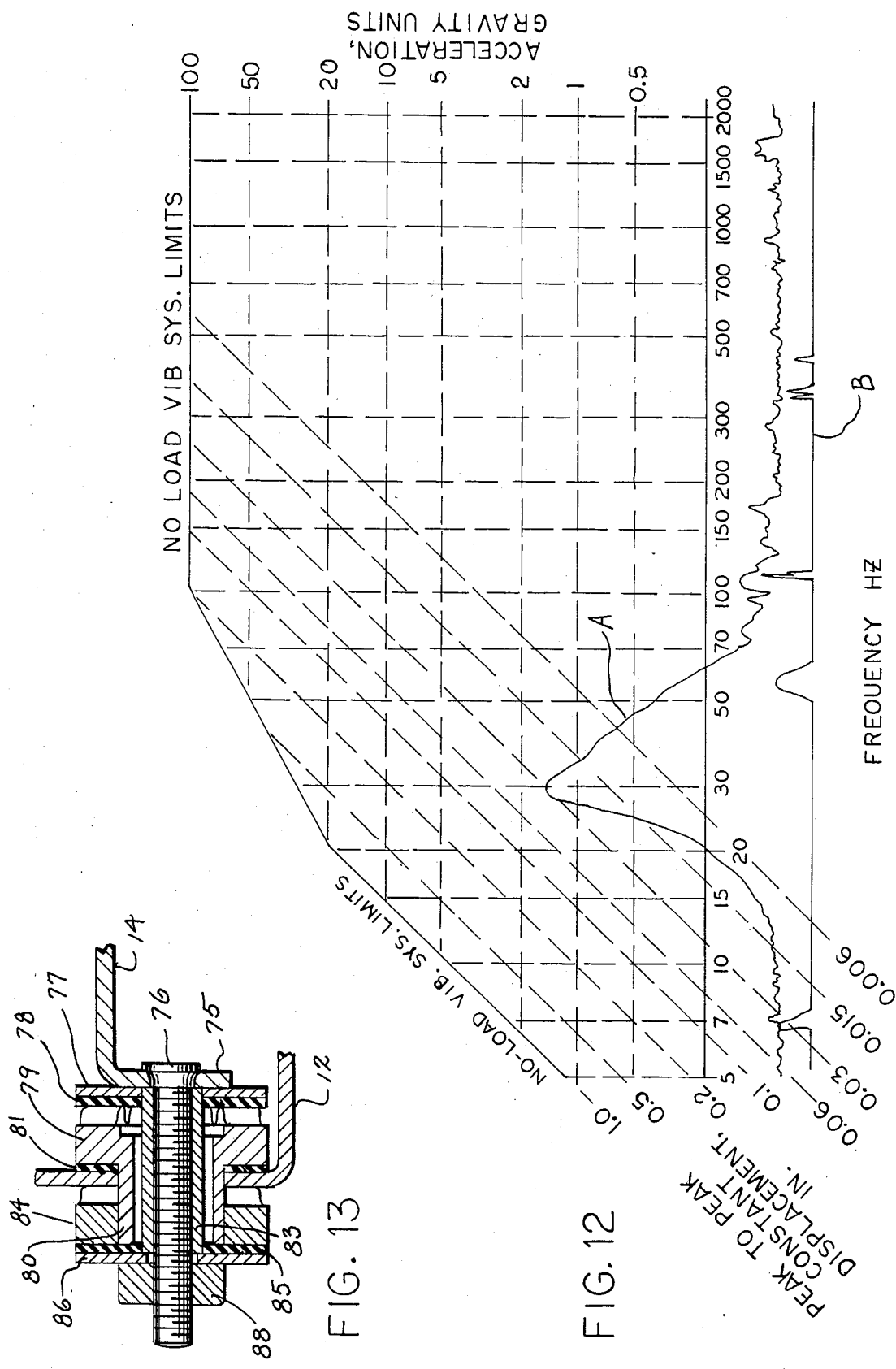

DISC DRIVE ISOLATION SYSTEM

BACKGROUND OF THE INVENTION

This invention relates to mounting enclosures for disc drive computer memory devices.

Disc drive memory devices usually have a storage medium and a read/write head to read from or write on the storage medium. The storage medium may be in the form of a disc or drum and may be rotationally driven at high speeds. The read/write head must write or read data to or from the medium at a particular position on the medium. Also, in some disc drive devices the read/write head is spaced closely to the medium, which may be rotating at a high speed. In such devices, contact between the head and the medium can destroy the head and the medium and result in the perpetual loss of the information stored on the medium.

Factory automation requires the presence of disc drive memory devices in industrial environments. Vibrations and shock abound in industrial environments which can result in the destruction of the head, the medium and the loss of the information on the medium. It can also cause read/write errors which result in the malfunction of machines controlled by the information from the disc drive. Also, the air can be less than pure and also may be too hot, too cold or too humid for the disc drive to operate. For the reliable and efficient operation of disc drives in industrial environments, a need exists for an enclosure for a disc drive to shelter the disc drive from the exterior environment.

SUMMARY OF THE INVENTION

The invention provides a disc drive isolation system for protecting a disc drive in an industrial environment. A disc drive isolation system of the invention includes an environment control enclosure and a disc drive isolation module. The disc drive is mounted within the module and is sequestered therein from vibrations and shocks applied to the exterior of the module and the module is received within the interior of the enclosure. A heat pump including a solid state thermo-electric element is mounted to the enclosure for cooling the interior of the enclosure in and around the disc drive. First temperature sensing means are mounted to the disc drive to control the heat pump and second temperature sensing means are mounted to the disc drive to control the disc drive. Humidity sensing means within the enclosure control the heat pump in response to the sensed humidity of the interior air. Highly reliable operation of the disc drive is thus assured as it does not depend upon the temperature, humidity, or cleanliness of the industrial environment in which it is used and is not affected by shocks and vibrations to which the enclosure is subjected.

In another aspect of the invention, the disc drive isolation module comprises a structurally rigid outer body defining an inner space. A structurally rigid inner body of symmetrical shape is smaller than the outer body and fits within the inner space defined by the outer body. The inner body is supported within the outer body by sets of biasing means to have three translational degrees of freedom and three rotational degrees of freedom. The disc drive is rigidly mounted within the inner body so that it is subjected to the shocks and vibrations that the inner body experiences. The translational displacement of the inner body within the outer body is at least 0.89 mm (0.035 inches) in all directions to protect the disc drive against high amplitude, low frequency vibration and shock which is common in industrial environments. The inner body is symmetrical to equalize inertial moments about the rotational axes. This arrangement isolates the disc drive from shock and vibration which could otherwise cause read/write errors or damage to the disc drive.

In an especially useful embodiment, first biasing means comprising a pair of extension springs are connected between the top sides of the inner and outer bodies to suspend the inner body within the outer body and second biasing means comprising a pair of compression springs are connected between the bottom sides of the inner and outer bodies for supporting the inner body within the outer body. Damping means are disposed between the inner and outer bodies on the top, bottom, left, right, front and rear sides of the inner and outer bodies, each said damping means terminating short of spanning the inner and outer bodies to permit the required displacement of the inner body. The springs of the first biasing means are diagonally opposed from the springs of the second biasing means to eliminate bobbing effects of the inner body. The damping means absorb higher level shocks that cause the inner module to exceed the permitted displacement.

In another aspect, each of the inner and outer bodies of the disc drive isolation module is made up of six identical plates which are fastened together to form either the inner or the outer body. Each plate has a flat rectangular inner portion, two pairs of first ears and two pairs of second ears. The ears are symmetrically disposed along the edges of the rectangular portion with each pair of first ears being opposite from the other pair of first ears and with each pair of second ears opposite from the other pair of second ears. Each ear has an outer and an inner hole with the center of each hole lying on a line which extends through the centers of the holes in the opposite ear. The ears of adjacent plates are fastened together to form either the inner or the outer body, depending upon which holes in the ears are used.

It is therefore a primary object of the invention to provide a disc drive isolation system which enables a disc drive to operate in an industrial environment.

It is another object of the invention to provide a disc drive isolation system to eliminate temperature, humidity, shock and vibration variables to which a disc drive is subjected in an individual environment.

It is another object of the invention to provide a disc drive isolation module for sequestering almost any disc drive from vibration and shock applied to the exterior of the module.

It is another object of the invention to provide a disc drive isolation module which can be easily and inexpensively provided.

It is another object of the invention to provide a disc drive isolation system which results in the highly reliable operation of a disc drive in the industrial environment.

These and other objects and advantages of the invention will become clear from the following detailed description and from the drawings.

DESCRIPTION OF THE DRAWINGS

FIG. 4 is a fragmentary front plan view of the system with the door removed;

FIG. 5 is a side plan view partially in section of the disc drive isolation system;

FIG. 12 is a graph comparing the results of testing a disc drive alone and testing it within the disc drive isolation module of FIG. 6;

FIG. 13 is a sectional view of a means for mounting a heat pump to an enclosure of the disc drive isolation system;

DETAILED DESCRIPTION OF THE PREFERRED EMBODIMENT

Figure 1:
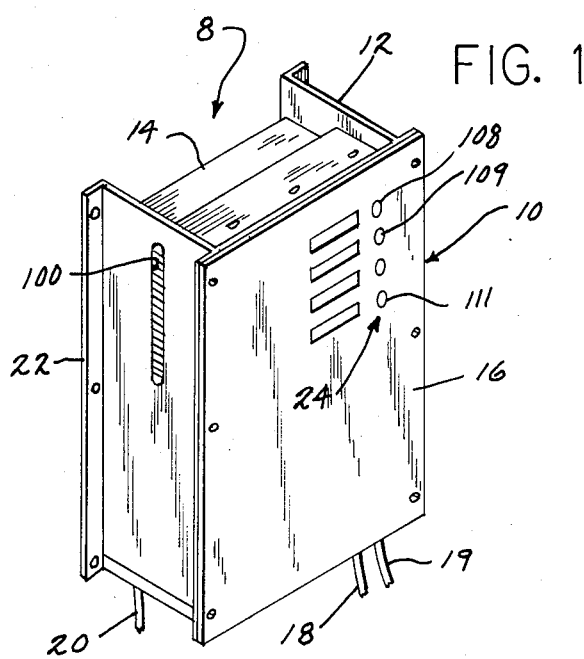
FIG. 1 is a front perspective view of a disc drive isolation system of the invention.
Figure 2:
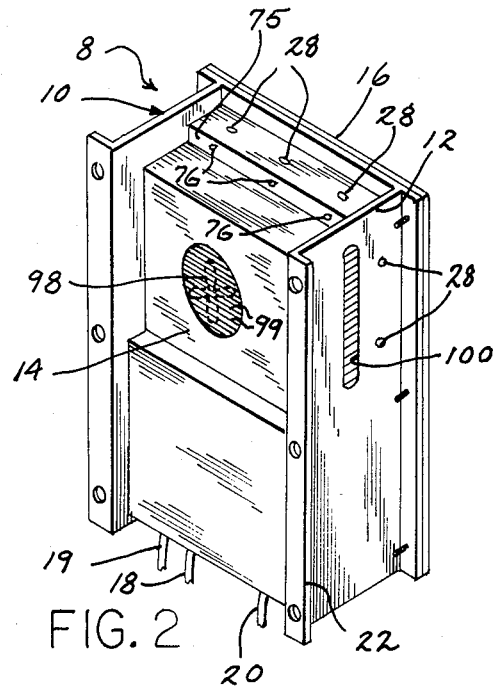
FIG. 2 is a perspective view of the system of FIG. 1 as viewed from the rear.

FIGS. 1 and 2 illustrate a disc drive isolation system 8 which includes an enclosure 10. The exterior of the enclosure 10 is formed by a sheet metal chassis 12 along the top, bottom, sides and rear, a heat pump 14 at the upper rear corner, and a rigid sheet metal door 16 which is secured to the front. Data cables 18 and 19 and a power cable 20 enter the bottom of the enclosure. The chassis 12 has flanges 22 for mounting the enclosure to a wall or in a control rack. An optional faceplate 23, FIG. 5, may be provided over the door for decorative or informational purposes and it may also be desirable to provide a bank of indicator lights 24 at the front of the enclosure.

Figure 3:
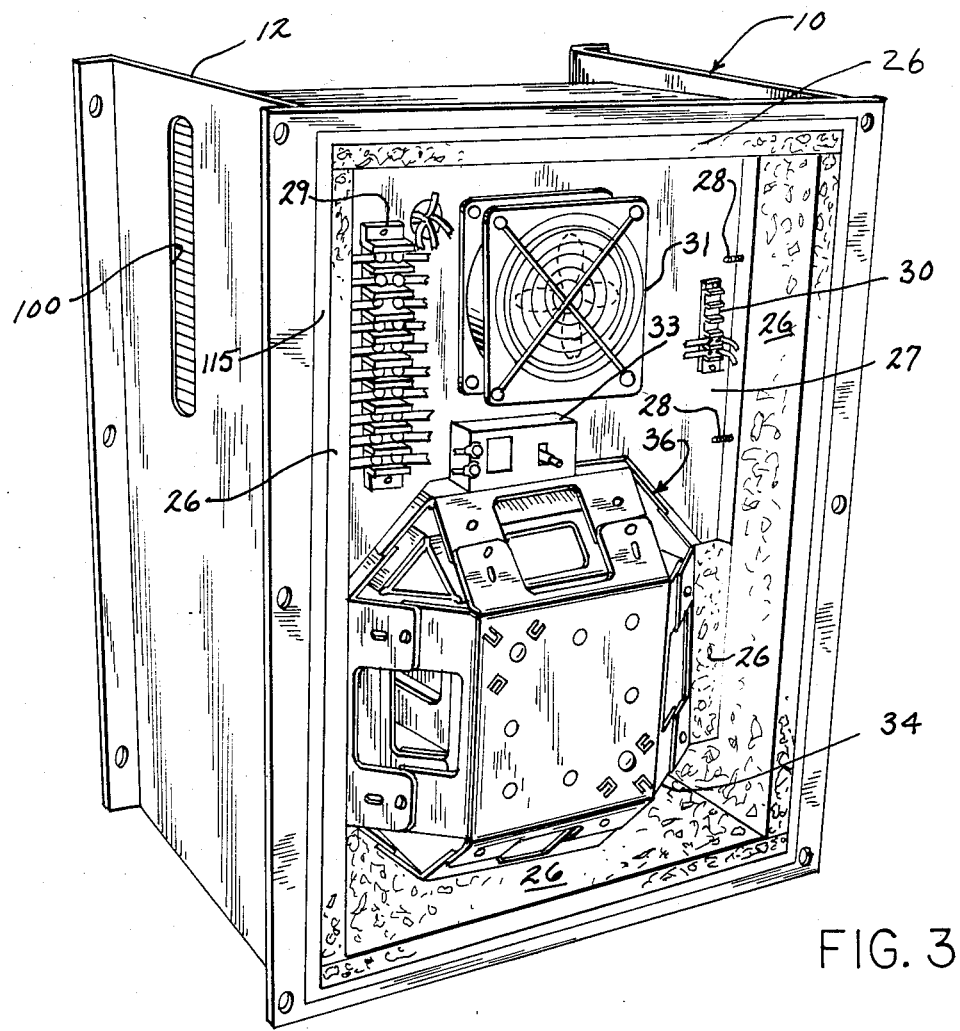
FIG. 3 is a perspective view similar to FIG. 1 with the door of the system removed.

FIG. 3 illustrates the enclosure 10 with the door 16 removed. A thermal insulation material 26, such as that sold under the trade designation Dow Ethafoam 220, lines the inside of the chassis 12 and of the door 16 (FIG. 5). A baffle plate 27 spans the upper portion of the chassis and is mounted with fasteners 28 to the side walls and top of the chassis 12. A pair of terminal blocks 29 and 30, a fan 31 and a humidistat 33 are mounted on the baffle plate 27. These devices are connected, along with others, in an environment control circuit which will be further described below.

The lower portion of the chassis 12 forms a cavity 34 in which is disposed a disc drive isolation module 36 which, together with the enclosure 10, makes up the isolation system 8. Referring particularly to FIGS. 4 and 5, the disc drive isolation module 36 is wedged between the foam insulation 26 in the cavity 34 to keep it stationary relative to the enclosure 10. However, the module 36 need not be wedged in the cavity in operation. In fact, as will become apparent below, the disc drive isolation module 36 performs its function of protecting the disc drive from shocks and vibrations whether it is mounted in the enclosure 10 or not.

Figure 6:
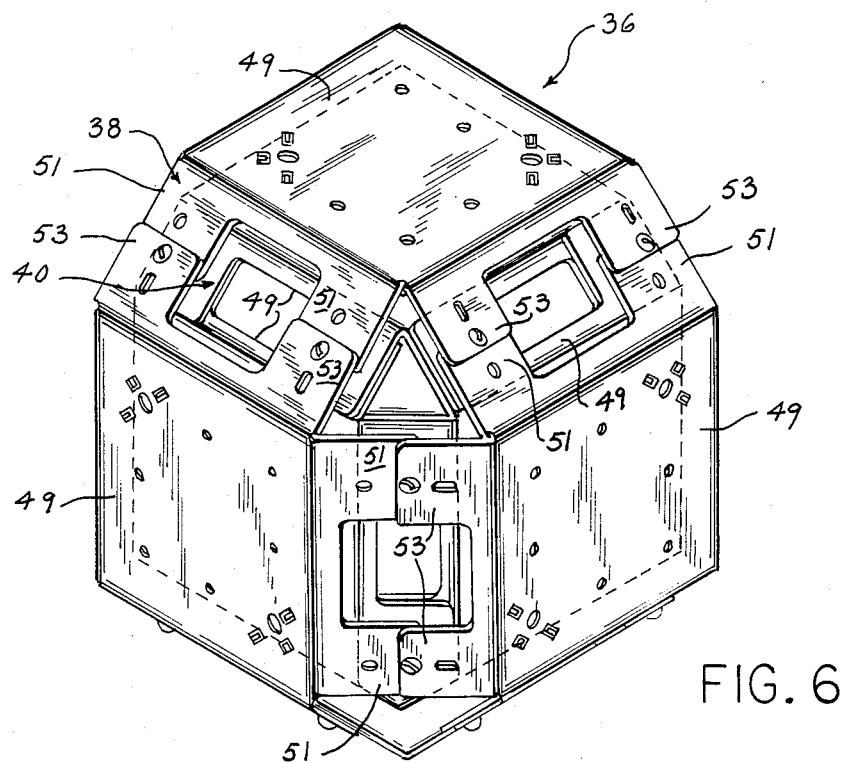
FIG. 6 is a perspective view of a disc drive isolation module for the disc drive isolation system.
Figure 7:
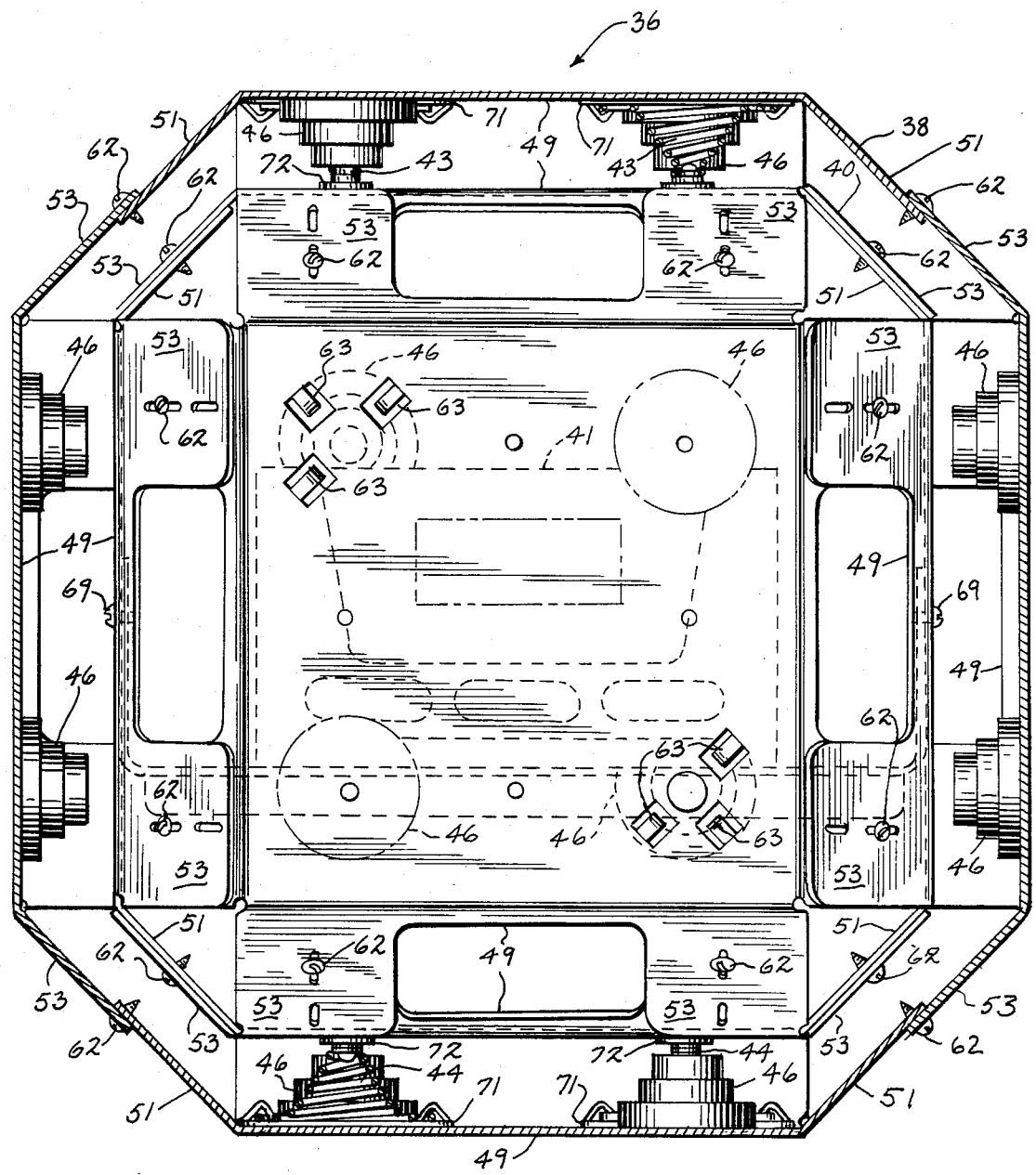
FIG. 7 is a front plan view partially in section of the disc drive isolation module of FIG. 6 illustrating a front pair of pads in phantom.

FIGS. 6 and 7 show the disc drive isolation module 36 removed from the enclosure 10. The module 36 is of generally hexahedron shape and includes an outer body 38 which defines an inner space in which an inner body 40 is mounted. A disc drive 41 is mounted within the inner body 40 by being bolted or otherwise rigidly secured to a tray 42 which spans the interior of the inner body and which is fastened to the sides of the inner body. The disc drive therefore is subjected to the same shocks and vibrations that the inner body 40 experiences. Preferably, the center of gravity of the disc drive 41 is as close as possible to the center of the inner body 40.

The inner body 40 is mounted approximately concentric with the outer body 38 so that it is out of direct contact with the outer body 38 and is isolated from the vibrations and shocks to which the outer body 38 is subjected. The inner body 40 has six degrees of freedom within the outer body 38, three translational degrees of freedom in orthogonal directions and three rotational degrees of freedom about orthogonal axes, so that it can rotate or translate in any direction. This mounting is achieved in the preferred embodiment by suspending the inner body 40 from the top of the outer body 38 with a biasing means and supporting it from the bottom with another biasing means. The top biasing means is a pair of conical springs 43 and the bottom biasing means is another pair of conical springs 44. Since the top springs 43 are in tension and the bottom springs 44 are in compression, the springs 43 and 44 are different from one another, being chosen to center the inner body within the outer body as closely as practical. Since the springs 43 and 44 are conical, they have non-linear stiffness characteristics to provide good dynamic vibration characteristics over a broad range of frequencies. Also, the conical configuration is more stable radially than a cylindrical spring.

Figure 8:
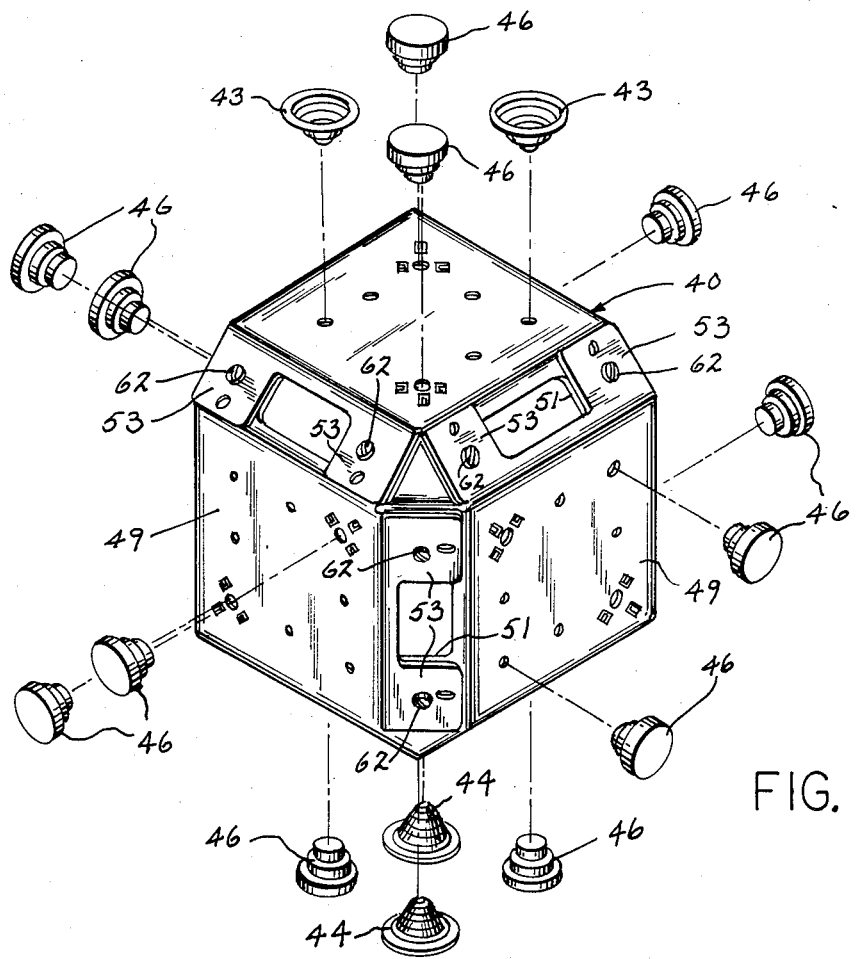
FIG. 8 is an exploded perspective view of a portion of the disc drive isolation module of FIG. 6.

The springs 43 and 44 are arranged so that they are diagonally opposed from top to bottom. That is, as viewed in FIG. 7, the top springs are positioned at the right front and at the left rear corners and the bottom springs are positioned at the left front and at the right rear corners. This diagonally opposed from top to bottom arrangement is also illustrated in FIG. 8. Since the inner body is symmetrical, this arrangement results in the inner body being properly oriented within the outer body with only four springs. It also reduces "bobbing" of the inner body 40 within the outer body 38 which can occur with other spring arrangements, such as if all four springs were on the top or bottom.

While the springs 43 and 44 function to isolate the inner body 40 from vibration and low level shock, dampening means are provided between the outer and inner bodies to absorb higher level shocks. The dampening means in the preferred embodiment is a pair of wedding cake-shaped foam pads 46 adhesively or otherwise mounted on the inside of each of the horizontal or vertical sides of the outer body (a total of 12 pads). The varying cross-sectional shape of the pads imparts non-linear force/compression characteristics to the pads so that they become progressively stiffer as they are compressed to resist direct contact between the inner and outer bodies for large shocks and yet provide a gradual dampening for smaller shocks. The material of the dampening means 46 has a relatively long response time, so that it is a good dampener for infrequent shocks. A material found suitable in practice is sold under the trade designation Material No. C-3001-25

PSA by Cabot Corporation, E.A.R. Division, Indianapolis, Indiana. Using this material, the response time of the dampening means from near full compression is about two minutes.

Each pad 46 in the preferred embodiment terminates short of spanning the inner and outer bodies by about 6.35 mm (0.25 in.) Like the springs 43 and 44, each pair of pads 46 is diagonally opposed from the opposite pair of pads. This provides sufficient high level shock protection with a minimum number of pads.

The spacing between the ends of the pads 46 and the inner body 40 is important. The spacing permits a sufficient displacement of the inner body 40 within the outer body 38 as the outer body 38 is subjected to relatively high amplitude, low frequency vibration to bring the acceleration forces to which the inner body 38 is subjected down to acceptable levels. This high amplitude, low frequency vibration is common in industrial environments and is not acceptable for the operation of many disc drives. The spacing between the ends of the pads 46 and the inner body 40 should be at least 0.89 mm (0.035 in.) to allow a sufficient displacement to isolate the disc drive from this type of vibration.

It is also important that the inner body be symmetrical. This not only helps center and orient the inner body 40 within the outer body 38 as mentioned above, but it also equalizes inertial moments about the rotational axes to which the module is subjected.

Figure 9:
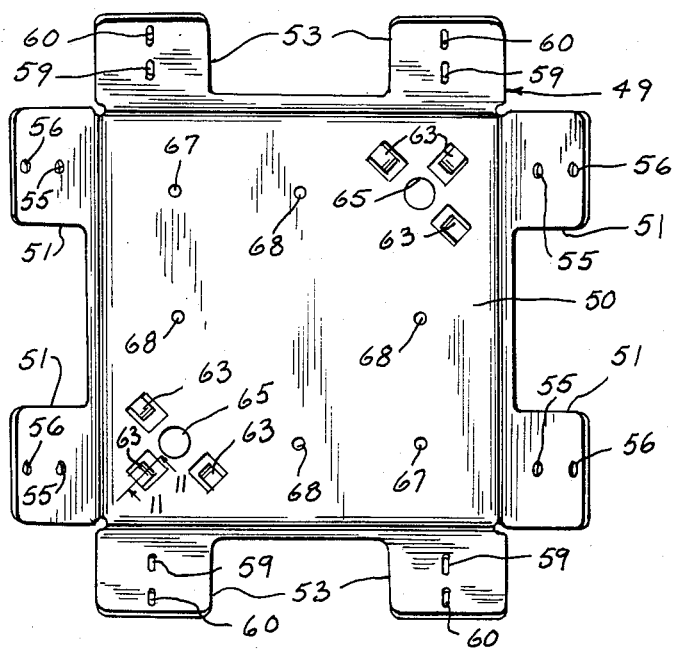
FIG. 9 is a plan view of a plate used to make the disc drive isolation module of FIG. 6.
Figure 10:
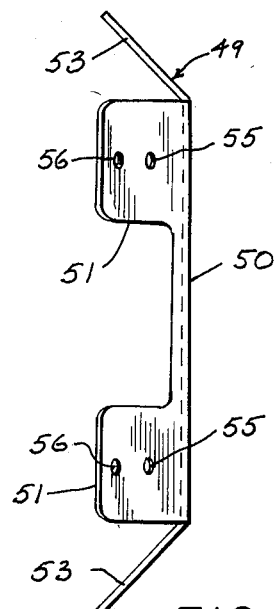
FIG. 10 is a side plan view of the plate of FIG. 9.

The outer and inner bodies 38 and 40 are of generally the same hexahedron shape, with the inner body 40 being smaller than the outer body 38. The construction of the outer and inner bodies 38 and 40 in the preferred embodiment is particularly advantageous because it can be easily and inexpensively provided. This is because both the outer body 38 and the inner body 40 are each made up of six identical plates 49, one of which is shown in FIGS. 9 and 10.

Each plate 49 is preferably stamped from sheet aluminum. The plate 49 has a flat rectangular inner portion 50 and two pairs of ears 51, each pair being opposite from the other, and two pairs of ears 53, with each pair being opposite from the other. The ears 51 and 53 are symmetrically disposed along the edges of the rectangular portion 50 and are all formed in the same direction at about a 45° angle to the rectangular portion 50. The only difference between the ears 51 and the ears 53 is that each ear 51 is provided with inner 55 and outer 56 holes which are round, and each ear 53 is provided with inner 59 and outer 60 holes which are oblong. The centers of the holes in each ear are along a line which extends through the centers of the holes in the opposite ear.

Referring to FIGS. 6, 7 and 8, six plates 49 are assembled to provide either the inner body 40 or the outer body 38 with the ears 53 always overlapping the ears 51. Therefore, the oblong holes 59 and 60 are always on the outside, and the round holes 55 and 56 are always on the inside. When all of the panels are assembled together, fasteners 62 are inserted through one of the oblong holes and screwed into one of the round holes of each respective ear 53 and 51 to secure the plates 49 together. If the smaller inner body 40 is being assembled, the fasteners are inserted through the oblong hole 59 and screwed into the round hole 55 of each respective ear 53 and 51. If the larger outer body 38 is being assembled, the oblong hole 60 and the round hole 56 of each respective ear 53 and 51 are used.

Figure 11:
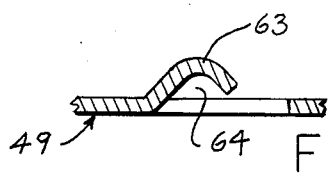
FIG. 11 is a sectional view taken along the plane of the line 11—11 of FIG. 9.

Each plate 49 is stamped to provide means for mounting the springs 43 and 44 to the inner and outer bodies 40 and 38, respectively. Four tabs 63 are formed in a circular pattern in diagonally opposite corners of the rectangular portion 50. Referring to FIG. 11, each tab 63 forms a space 64 between itself and the inner surface of the plate 49. A hole 65 is formed concentric with the circular pattern of the tabs 63. Smaller holes 67 are formed at the other two corners of a rectangular pattern defined by the holes 65 and 67 and four holes 68 are formed intermediate the holes 65 and 67.

Referring to FIGS. 4, 5 and 7, two of the holes 68 in each of the plates 49 on the left and right sides of the inner body 40 are used to mount the disc drive supporting tray 42 with fasteners 69. With the inner body completely assembled, the springs 43 and 44 are loosely assembled to the top and bottom plates 49, respectively, by inserting a fastener with a suitably large head through the small end of the spring and screwing the fastener into one of the holes 67. An annular PVC pad 72 is preferably placed between the small end of each spring 43 and 44 and the respective top or bottom plate 49 to reduce friction between the end of the spring and the plate.

The inner body 40 with the springs 42 and 43 loosely attached is then placed inside the outer body 38, which, of course, must be done before the outer body is completely assembled. The inner body 40 is placed within the outer body 38 with the large end of the springs 42 and 43 adjacent to the tabs 63. The assembly of the outer body 38 is then completed. Since the springs are only loosely attached to the inner body, each spring can be rotated to thread its leading coil through the spaces 64 to be captured by the tabs 63. A PVC pad 71 to reduce friction is also preferably placed between the large end of each spring and the outer body. A screw driver is then inserted through the holes 65 to tighten the fasteners against the small ends of the springs.

Tests were performed subjecting the module 36 to shock and vibration loads. The disc drive 41 tested with the module 36 was a 51.9 M byte Winchester technology head disc assembly. The disc drive tested had a housing which enclosed a read/write mechanism. The sensor was secured directly to the read/write mechanism for each test. The plates 49 used were made from about 1.5 mm (0.060 inch) thick aluminum and were about 22.5 cm (8.9 inches) square. The top springs 43 were made from 1.777 mm (0.070 inch) diameter music wire with a 2.386 mm (0.094 inch) pitch and an overall length of 19.036 mm (0.750 inch). The bottom springs 44 were made from 2.030 mm (0.080 inch) diameter music wire with a pitch of 4.365 mm (0.172 inch) and an overall length of 34.898 mm (1.375 inches). Both springs had eight coils with the small end coil ground flat and the coil diameter ranging from 7.208 mm (0.284 inch) to 45.051 mm (1.775 inches) in increments of 5.406 mm (0.213 inch).

To test the disc drive alone, the housing of the disc drive was bolted to a vibration table to be vibrated along an axis parallel to the width of the disc drive (from left to right as viewed in FIG. 4). The vibration input to the housing was 0.152 mm (0.006 inch) peak to peak amplitude from 5 to 40 Hz and 0.5 G from 40-2000 Hz. Tracing A in FIG. 12 illustrates the results. Tracing A shows that the read/write mechanism resonates at about 30 Hz, with an amplitude of about 0.761 mm (0.030 inch) and an acceleration of about 1.5 G. Also note that since most electric motors run at 3600 rpm, which is a multiple of 30 Hz, 30 Hz is a fairly common frequency in industrial environments.

Tracing B shows the results of mounting the disc drive in the isolation module 36 and bolting the outer body 38 to the vibration table. The test was conducted for the same input amplitude as above from 5–40 Hz but the input was doubled to 1.0 G from 40–2000 Hz. The resonance at 30 Hz was completely eliminated and, even though the input from 40–2000 Hz was doubled, there were no objectionable vibrations experienced by the read/write mechanism.

The module was also tested for high level shock isolation. Again, the disc drive was tested alone and then mounted in the module to compare the results. A 15 G input applied over a period of 11 msec was applied along a direction parallel to the width of the disc drive. For the input applied directly to the disc drive housing, a sensor mounted on the read/write mechanism indicated an acceleration of about 80–100 G. When the disc drive was mounted in the module 36 and the input was applied to the outer body 38, this 80–100 G was reduced to about 2–3 G. Note that allowing a displacement of the inner body of at least 0.89 mm (0.035 in.) enables the input to exceed 15 G if applied over 11 msec or longer.

As indicated by these results, the disc drive isolation module 36 dramatically attenuates the shocks and vibrations to which a disc drive within it is subjected. In an industrial environment, the attenuation afforded by the module can mean the difference between catastrophic destruction of the disc drive or read/write errors and a smoothly running automated machine or assembly line.

The module 36 is a unit and as such performs its function whether or not it is mounted in the enclosure 10. The module 36 is mounted in the enclosure 10 for reasons apart from isolating the disc drive from external shocks and vibrations. A factory may be too hot, too cold, too dirty or too humid for the proper operation of the disc drive. The enclosure 10 therefore provides a controlled temperature and humidity chamber for the disc drive to operate in.

The heat pump 14 and a pair of temperature sensors TS-1 and TS-2, mounted to the left side of the disc drive housing as shown in FIG. 4, make up part of the means for controlling the temperature inside the enclosure 10. The heat pump 14 of the preferred embodiment includes a thermo-electric element 73 commercially available from Thermo-Electric Cooling America Company, Chicago, Illinois, under the trade designation Model No. AHP 1000. The thermo-electric element 73 is a solid state active heat exchanger having no moving parts so that the temperature control system of the enclosure 10 is extremely reliable. The thermo-electric element 73 also makes the heat pump 14 simple to incorporate into the system 8, easy to mount and of low weight.

Referring to FIG. 5, the heat pump 14 has an upper and a lower flange 75. Three threaded studs 76 are welded to and are spaced along each flange 75 for securing the heat pump 14 to the chassis 12. A fastening arrangement as shown in FIG. 13 is preferred to reduce the transmission of vibrations from the heat pump 14 to the chassis 12 and to seal the interior of the chassis 12 from the leakage of air around the studs 76. A washer 77, a neoprene gasket 78, a flange 79 of a sleeve 80 made from a vibration absorbing material, and another neoprene gasket 81 are sandwiched between the flange 75 and the chassis 12 around each stud 76.

The sleeve 80 and stud 76 extend through a hole in the chassis, with a smooth metal sleeve 83 threaded onto the stud 76 to prevent wear of the sleeve 80 by the threads of the stud. An annular element 84 of vibration absorbing material surrounds the sleeve 80, a neoprene gasket 85 abuts the end of the sleeve 80 and closely surrounds the sleeve 83, and a washer 86 abuts the end of the sleeve 83 and surrounds each stud 76 on the inside of the chassis 12. A nut 88 is threaded onto the end of each stud to clamp the sleeve 83 between the washer 86 and the flange 75 with the sleeve 80 and element 84 in compression. A sleeve 80 and element 84 found suitable in practice is commercially available from Cabot Corporation, E.A.R. Division, Indianapolis, Ind. and is made from material designated C-1100 by Cabot Corporation.

Referring again to FIG. 5, the thermo-electric element 73 has a cold side 90 having heat transfer fins 91 inside the enclosure 10 and a hot side 93 having heat transfer fins 94 outside the enclosure 10. The cold side 90 extends through an opening in the chassis 12 which is slightly larger than the cold side and a neoprene gasket 97 surrounds the thermo-electric element 73 between the chassis 12 and the hot side 93 to prevent air leakage around the sides of the element 73. Heat absorbed at the cold side 90 is pumped to the hot side 93 at a rate proportional to the current passing through the element 73. In addition to the thermoelectric element 73, the heat pump 14 may include a fan 98 behind grates 99 (FIG. 2) which blows relatively cool ambient air over the hot side fins 94 to expel the heat to the environment. Slots 100 (FIGS. 1–3) are formed in the side walls of the chassis 12 adjacent to the ends of the fins 94 to allow for the exit of warmed air from the fins 94.

The fan 31 blows air into the space behind the baffle plate 27 onto the cold side fins 91. The fins 91 are not as long as the interior of the enclosure 10 is wide so that cooled air can escape past the ends of the fins 91 and flow down into the cavity 34. The construction of the module 36 is open, that is, the ears 51 and 53 form open spaces between them. The cool air circulates through the open spaces into the interior of the inner body 40 to cool the disc drive 41. In operation, the disc drive expels about 33–35 watts of power which warms the air as it passes by the disc drive. The air warmed by the disc drive is then sucked up into the fan 31 to be recirculated through the enclosure.

When the disc drive is operating with the enclosure in ambient temperatures cooling will usually be required. However, in some applications it may be necessary to pre-warm the interior of the enclosure 10 before the disc drive can be started. For this purpose, the heat pump 14 also includes a 100 watt cartridge heater 103 which is embedded in the central portion of the cold side fins 91.

The element 73 and cartridge heater 103 are controlled by the temperature sensors TS-1 and TS-2. The sensors TS-1 and TS-2 sense the temperature of and around the disc drive housing to open or close a circuit connected to the element 73 and heater 103. In the preferred embodiment, TS-1 and TS-2 are bimetal-type switches.

Sensor TS-1 controls the element 73. Below about 40° C. (104° F.) the sensor TS-1 will be open so that the element 73 will be off. However, neither TS-1 nor TS-2 controls the fans 31 and 98, which are normally on. As the temperature within the enclosure 10 rises past about 40° C. (104° F.), due for example to the heat generated by operating the disc drive, sensor TS-1 will close to turn the element 73 on to begin cooling the interior of the enclosure 10. There is a differential of about 11° C.

(20° F.) between the temperature at which the sensor TS-1 closes and the temperature at which it opens. The element 73 will therefore continue to cool the interior of the enclosure 10 until TS-1 senses a temperature of about 29° C. (84° F.).

Sensor TS-2 controls the heater 103. Above about 22° C. (72° F.), sensor TS-2 is open so that the heater 102 is off. As the temperature falls below about 22° C., TS-2 is closed so that the heater 103 will heat the interior of the enclosure 103. As the temperature rises past about 22° C. (72° F.), TS-2 will open to shut off the heater 103. With a normal ambient temperature, the temperature in the enclosure 10 will continue to rise due to the heat generated by the disc drive until the element 73 turns on to cool the enclosure. However, if after the cartridge heater turns off the temperature in the enclosure falls, the cartridge heater would not turn back on until somewhat below about 22° C. due to the differential of TS-2. The differential of TS-2 in the preferred embodiment is about 3° C. (6° F.) so that the heater 103 would turn back on at about 19° C. (66° F.).

Another pair of temperature sensors TS-3 and TS-4 are mounted on the right side of the disc drive housing as best shown in FIG. 5. The sensors TS-3 and TS-4 set upper and lower limits on the operating temperature of the disc drive 41. If the sensed temperature is too high or too low, the disc drive motor will automatically be turned off by the sensors TS-3 and and TS-4. Like TS-1 and TS-2, TS-3 and TS-r are bimetal switches in the preferred embodiment.

Sensor TS-3 determines the upper limit of the range of acceptable operating temperatures for the disc drive 41. As the temperature sensed by TS-3 rises past about 55° C. (131° F.), TS-3 opens thereby cutting off power to the disc drive motor. Sensor TS-3 will not close to resume power to the disc drive motor until it senses a temperature of about 52° C. (125° F.) due to its differential of about 3° C. (6° F.).

Sensor TS-4 determines the lower limit of the range of acceptable operating temperatures for the disc drive 41. Below about 15° C. (59° F.), sensor TS-4 will be open to shut off the power to the disc drive motor. As the temperature in the enclosure rises past about 15° C., TS-4 closes to provide power to the disc drive motor. If for some reason the temperature would then start to fall, TS-4's differential of about 3° C. (6° F.) would not allow it to re-open until the temperature reached about 12° C. (53° F.).

In summary of the temperature control means, below about 15° C. (59° F.), no power is provided to the disc drive motor but the cartridge heater 103 is operating to heat the enclosure. At about 15° C., TS-4 closes to provide power to the disc drive motor so that both the disc drive and the cartridge heater 103 are generating heat to raise the temperature of the enclosure. When the temperature reaches about 22° C. (72° F.), TS-2 opens to shut the cartridge heater 103 off. The disc drive 41 continues to operate thereby generating heat to raise the temperature of the enclosure. When the temperature reaches about 40° C. (104° F.), TS-1 closes to turn the element 73 on to reduce the temperature inside the enclosure. If the temperature continues to rise, when it reaches about 55° C. (131° F.), TS-3 opens to turn the disc drive off.

However, even if the temperature inside the enclosure is acceptable, condensation can form on the disc or head which results in damage to the disc drive or read/write errors. To prevent condensation, the humidistat 33 monitors the relative humidity in the enclosure 10. The humidistat 33 opens to turn the entire temperature control system including the fans 31 and 98 off if the relative humidity rises above about 80%. Note that it does not turn off the disc drive 41. It does not because the heat generated by the disc drive reduces the relative humidity in the immediate vicinity of the disc drive. This heat is particularly effective to reduce the relative humidity in the vicinity of the disc drive when the environmental control system is not operating as the heat then tends to concentrate around the disc drive, thereby lowering the relative humidity in that vicinity. Unless the temperature of the disc drive rises above about 50° C. (122° F.) so that the sensor TS-3 shuts it off, the heat generated by the disc drive will eventually lower the relative humidity throughout the interior of the enclosure and the humidistat will close to resume power to the environment control system. The humidistat 33 used in the preferred embodiment was of the type having a nylon element to expand and contract to operate a switch.

Figure 14:
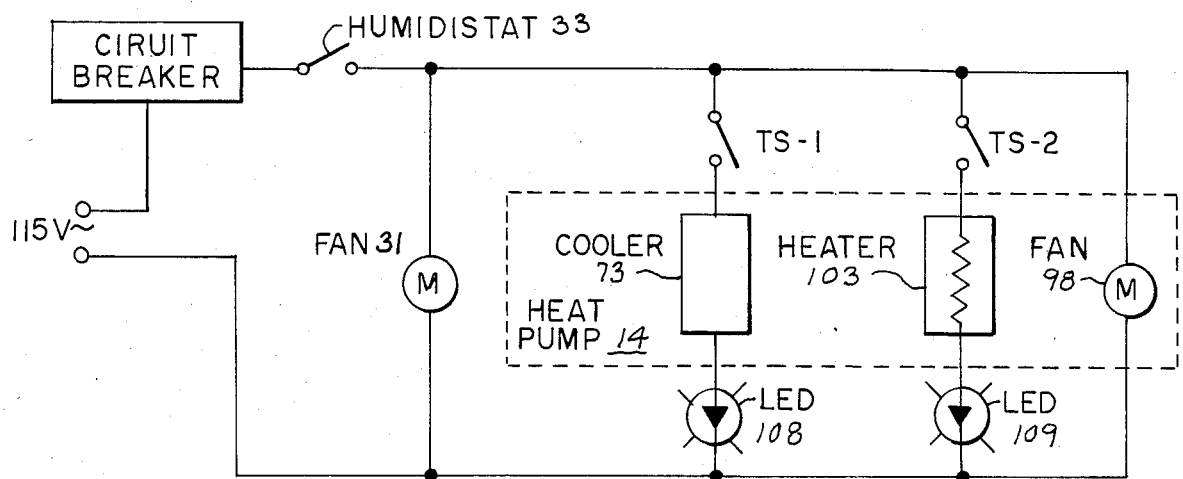
FIG. 14 is a control circuit for the heating and cooling means for the disc drive isolation system.

A schematic diagram of a circuit 105 to control the temperature and humidity as described above is shown in FIG. 14. 115 volt line power is admitted to the enclosure 10 by the power cable 20. A circuit breaker 106 should be provided, which is connected between one node of the humidistat 33 and line power. The fans 31 and 98 are connected in parallel between ground and the other node of the humidistat 33. Also connected in parallel between ground and the other node of the humidistat 33 are TS-1, the element 73 and an LED indicator 108 connected in series, and TS-2, the heater 103 and an LED indicator 109, connected in series. The LED indicators 108 and 109 are mounted along the front of the enclosure in the bank 24 to indicate when the element 73 and heater 103, respectively, are on.

Figure 15:
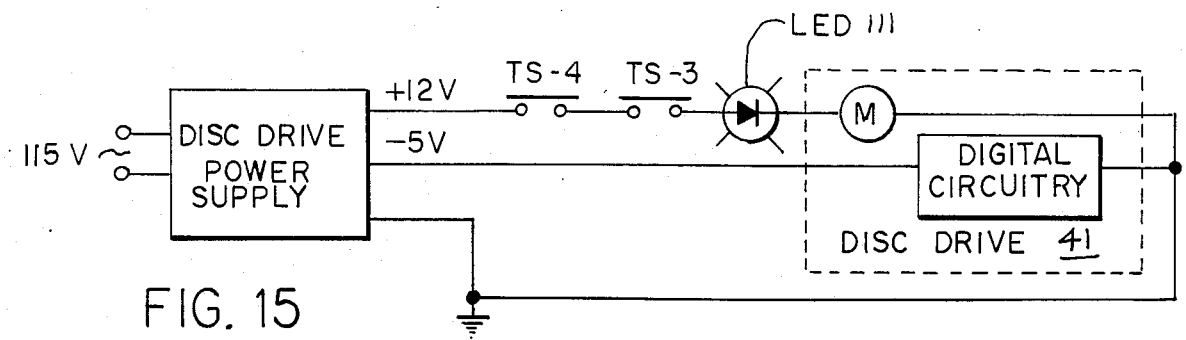
FIG. 15 is a schematic view of a control circuit for the disc drive isolation system to control the disc drive.

FIG. 15 illustrates a schematic view of a circuit for the out of range temperature control of the disc drive 41. A disc drive power supply outside of the enclosure 10 converts line power into 12 VDC and 5 VDC power for the disc drive motor and the disc drive digital circuitry, respectively. The 12 and 5 VDC power lines are introduced into the enclosure 10 by one of the cables 18 and 19 and the 5 VDC is connected directly to a 5 VDC input terminal of the disc drive. The sensors TS-3 and TS-4 are connected in series between the 12 VDC input terminal of the disc drive 41 and the 12 VDC power supply, with the disc drive and power supply suitably grounded. An LED indicator 111 may also be provided in the bank 24 to indicate when the temperature is in the operating range. Note that it may be desirable to provide other LED indicators in the bank 24 such as one to indicate when the read/write head is actuating.

All openings in the chassis 12 are sealed to prevent air leakage into or out of the enclosure 10. A neoprene gasket 113 resides between the door 16 and an angle flange 115 which circumscribes and is welded to the chassis 12 (FIG. 5). Other neoprene gaskets or sealing means (not shown) seal the openings for the cables 18, 19 and 20, and the holes for the fasteners 28 of the baffle plate 27. Therefore, the interior of the enclosure is completely sealed from any air exchange with the outside environment so that the air which is trapped within the enclosure 10 when it is assembled remains in the enclosure 10. The humidity of the air that is trapped within the enclosure 10 may be controlled by placing a suitable dessicant within the enclosure 10.

The disc drive isolation system fully described above enables a disc drive to operate in an industrial environment. The system can be adapted to protect almost any disc drive from shocks and vibrations which it may otherwise be subjected to in the industrial environment. It also provides a temperature and humidity controlled chamber for the disc drive which is extremely reliable. Therefore, operation of a disc drive in an industrial environment is no longer dependent upon the temperature, humidity, cleanliness or vibration and shock characteristics of the industrial environment.

Various modifications and variations to the preferred embodiment will be apparent to those skilled in the art which will still embody the invention. For example, the invention is not limited to being used with a Winchester technology disc drive, although that type of disc drive is advantageous for its large memory capacity. Therefore, the invention is not intended to be limited to the scope of the preferred embodiment, but only by the claims which follow, except as otherwise required by law.

I claim:

1. A disc drive isolation system, comprising:
   a disc drive isolation module for sequestering a disc drive from vibration and shock applied to the module;
   an environment control enclosure having an interior in which the disc drive isolation module is disposed and an exterior, said enclosure including:
      a heat pump mounted to the enclosure including a solid state thermo-electric element for cooling the interior of the enclosure in and around the disc drive;
      first temperature sensing means mounted to the disc drive for controlling the cooling means, said first temperature sensing means actuating the cooling means when the sensed temperature rises above a cooling temperature;
      second temperature sensing means mounted to the disc drive for controlling the disc drive, said second temperature sensing means setting an upper limit and a lower limit on the range of temperatures within which the disc drive will operate, said upper limit being higher and said lower limit being lower than the cooling temperature;
      thermal insulation means lining the enclosure to resist heat flow to and from the interior of the enclosure;
      sealing means to seal the interior from the exterior of the enclosure to limit air leakage; and
      humidity sensing means within the interior of the enclosure to control the cooling means in response to the sensed humidity of the interior air.

2. A disc drive isolation system as in claim 1, wherein the disc drive isolation module comprises:
   a structurally rigid outer body;
   a structurally rigid inner body within the outer body;
   biasing means supporting the inner body within the outer body out of direct contact with the outer body;
   damping means between the inner and outer bodies; and
   means for rigidly mounting the disc drive within the inner body.

3. A disc drive isolation system as in claim 1, wherein the enclosure further comprises heating means for heating the air within the enclosure and third temperature sensing means for controlling the heating means, said third temperature sensing means actuating the heating means when the sensed temperature falls below a heating temperature, said heating temperature being below the lower limit of the second temperature sensing means.

4. A disc drive isolation system as in claim 1, wherein the disc drive isolation module is of an open construction having spaces formed therein through which air can circulate to cool the disc drive and further comprising a fan for circulating air past the thermo-electric element and into the isolation module.

5. A disc drive isolation module for sequestering a disc drive device from vibration and shock applied to the exterior of the module, comprising:
   a structurally rigid outer body of generally hexahedron shape having spaced apart top and bottom sides, spaced apart left and right sides, and spaced apart front and rear sides so that said outer body defines an inner space;
   a structurally rigid inner body of generally hexahedron shape smaller than said outer body and having spaced apart top and bottom sides, spaced apart left and right sides, and spaced apart front and rear sides, the inner body fitting within the inner space defined by the outer body with the sides of the inner body spaced apart from the sides of the outer body;
   first biasing means connected between the top sides of the inner and outer bodies for suspending the inner body within the outer body;
   second biasing means connected between the bottom sides of the inner and outer bodies for supporting the inner body within the outer body;
   damping means between the inner and outer bodies on the top, bottom, left, right, front and rear sides of the inner and outer bodies, each said damping means terminating short of spanning the inner and outer bodies; and
   means for rigidly mounting the disc drive within the inner body;
   wherein the module is disposed in an enclosure, said enclosure comprising:
   a chassis defining a cavity in which the disc drive isolation module is disposed;
   cooling means for cooling air within the cavity;
   fan means for circulating air within the enclosure through the cooling means and into the cavity;
   a door for closing the chassis cavity;
   thermal insulation means lining the chassis and the door;
   sealing means for sealing the interior of the enclosure and door from the exterior;
   first temperature sensing means mounted to the disc drive for controlling the cooling means in response to the sensed temperature;
   second temperature sensing means mounted to the disc drive for controlling the disc drive in response to the sensed temperature; and
   humidity sensing means within the enclosure for controlling the cooling means and the fan means in response to the sensed humidity of the air within the enclosure.

6. A disc drive isolation module as in claim 5, wherein the enclosure further comprises heating means for heating the air within the enclosure and third temperature sensing means for controlling the heating means in response to the sensed temperature.

7. A disc drive isolation module as in claim 5, wherein the sides of the inner and outer bodies form open spaces so that air can circulate into and out of the inner body.

* * * * *